Jan. 8, 1963    J. A. RAGLAND    3,072,364
WING
Filed Aug. 15, 1958    2 Sheets-Sheet 1
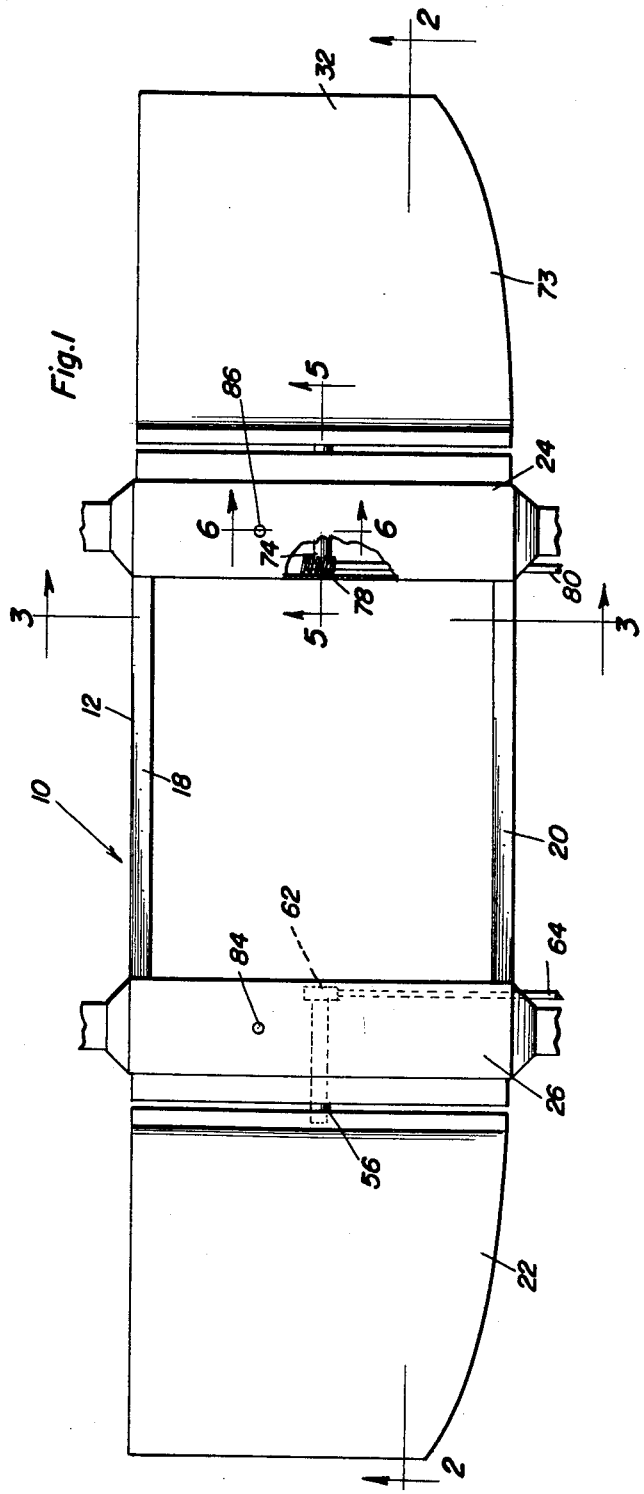
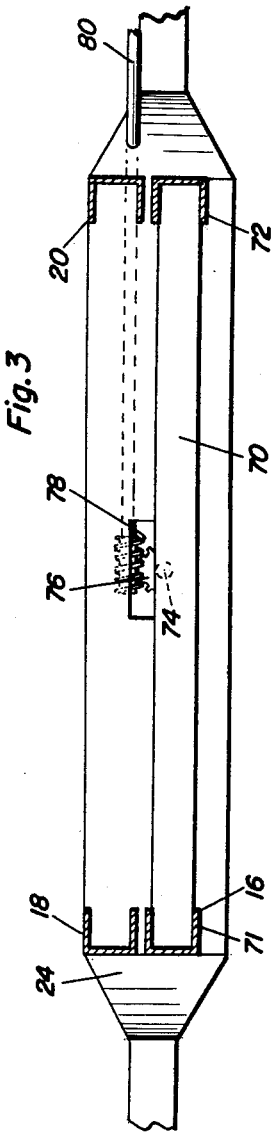
Joseph A. Ragland
INVENTOR.
BY Jan. 8, 1963
J. A. RAGLAND
3,072,364
WING
Filed Aug. 15, 1958
2 Sheets-Sheet 2
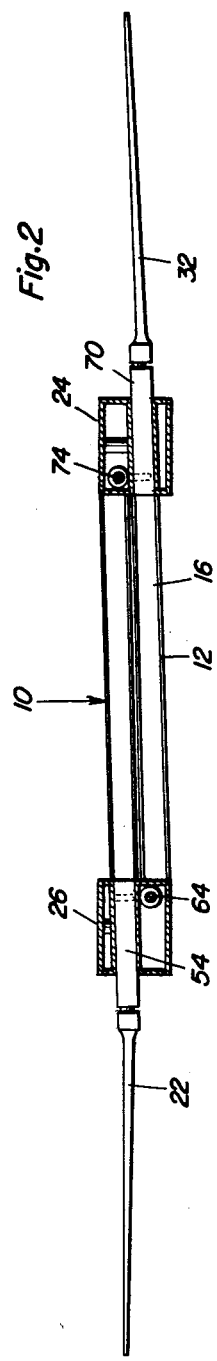
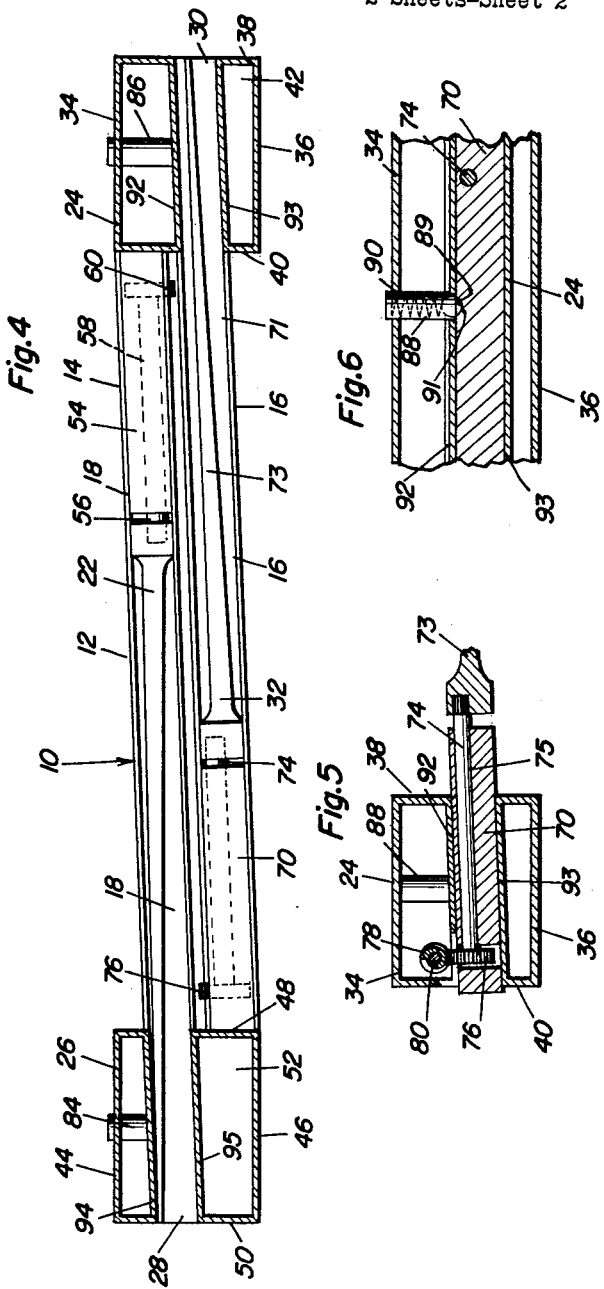
Joseph A. Ragland
INVENTOR.

United States Patent Office 3,072,364
Patented Jan. 8, 1963

3,072,364
WING
Joseph A. Ragland, 3265 N. Willowood Lane,
Beaumont, Tex.
Filed Aug. 15, 1958, Ser. No. 755,348
8 Claims. (Cl. 244—2)

This invention relates to airplane wings and more particularly to a pair of longitudinally translational wings to adapt an automobile-type vehicle to air travel.

An object of the invention is to provide means for storing a pair of wings in a motor vehicle and for retaining the wings in the extended position at which the motor vehicle is capable of flight and controlled by adjustment of the wings.

A further object of the invention is to provide a mechanically simple conversion assembly for a motor vehicle, the assembly making it possible to use the motor vehicle on land and yet by very easy adjustment convert that vehicle for air travel by extension of a pair of wings that are neatly retained in place and concealed within the motor vehicle.

Another object of the invention is to provide a device of the nature described which is mechanically simple, devoid of complicated mechanisms and parts thereby achieving an economy in weight and cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a plan view of the assembly with the wings extended.

FIGURE 2 is a longitudinal sectional view taken on the line 2—2 of FIGURE 1.

FIGURE 3 is a transverse sectional view taken on the line 3—3 of FIGURE 1.

FIGURE 4 is a longitudinal enlarged sectional view of the assembly with the wings in the retracted position.

FIGURE 5 is an enlarged sectional view taken on the line 5—5 of FIGURE 1.

FIGURE 6 is a fragmentary sectional view on an enlarged scale and taken on the line 6—6 of FIGURE 1.

In the accompanying drawings there is an assembly 10 which is adapted to be connected rigidly to the usual motor vehicle capable of land travel. By a usual motor vehicle it is meant one which is designed as light as possible since the assembly 10 is used as a component part of such a vehicle to convert it to an aircraft. The assembly is composed of a frame 12 having an upper section 14 and a lower section 16. The upper section is made of two inwardly opening channels 18 and 20 that function as guides for wing 22. The ends of the guides are connected to transverse frame members 24 and 26 of hollow construction, each having one slot 28 and 30 at alternate outer edges thereof to form entrances for wing 22 and wing 32 respectively. Entrance 28 is in the upper section 14 while entrance 30 is in the lower section 16. Frame member 24, being of box construction has an upper side 34, a lower side 36 and perpendicular sides 38 and 40, all joined to the two ends 42. Frame member 26 has an upper side 44, a lower side 46, sides 48 and 50, all joined to the ends 52. Sides 40 and 48 have the ends of the guides rigidly fixed thereto, as by welding to form one, rigid, and unitary frame 12. Wing 22 has a slide 54 at its root end which is adapted to slide in the guides 18 and 20. The wing proper has a spindle 56 at its inner end rigidly fixed in place and passed through a passageway 58 extending transversely into slide 54. A conventional gear 60 has teeth fixed to the inner end of spindle 56 and is adapted to become enmeshed with the teeth of worm 62 at the end of control shaft 64 when the wing is fully extended from frame 12. The control shaft enters the frame 12, from a location remote from assembly 10 and is adapted to be rotated in order to correspondingly rotate the wing proper 22 about the longitudinal axis of spindle 56 in order to provide lateral control for the vehicle when it is used as an airplane.

Wing 32 has a slide 70 at its inner end and constrained in its travel by being disposed in the guides 71 and 72 of lower section 16. The wing proper 73 has a spindle 74 fixed to the inner end thereof and mounted for rotation in passageway 75 in slide 70 (FIGURE 5). Gear 76 is fixed to the inner end of spindle 74. The upper edge of gear 76 projects above slide 70 and its teeth are adapted to mesh with the teeth of worm 78 that is fixed to control shaft 80 when the slide and wings are slid into operative position as shown in FIGURE 5. This control shaft 80 is passed through an opening in the frame 12 and is adapted to be rotated by a mechanism (unshown) from the interior of the vehicle. This is to further achieve lateral control for the vehicle when it is airborne.

An automatic locking member or detent 84 is connected with the top part of frame member 26, and there is an identical automatic locking member or detent 86 connected to frame member 24. The locking members are each constructed the same (FIGURE 6) consisting of either a pin or a small casing 88 in which there is a ball 89 pressed by spring 90 into contact with the top surface of one of the slides, for instance slide 70. This holds the wing 73 in the extended position. A recess 91 is formed in the top surface of the slide 70 so that the ball 89 can snap into place when the wing is extended fully to the correct position and which gear 76 is enmeshed properly with worm 78. When in this position the top and bottom surfaces of the slide 70 are in contact with spaced plates 92 and 93 that are at a slight angle to the horizontal plane and that are attached to sides 38 and 40 of frame member 24. When wing 22 is extended, slide 54 is in contact with guide plates 94 and 95 within frame member 26 and near entrance 28. Here again, the guide plates 94 and 95 firmly hold the slide 54 in proper alignment and very firmly.

As seen in FIGURE 4, the upper section has its guides arranged at an angle to the horizontal, and the lower section has the guides thereof parallel to the guides of the upper section. In order to obtain correct dihedral for the wings when extended, the upper wing has the wing proper set upwardly at an angle with respect to its slide 54 while the lower wing proper is approximately made as a longitudinal extension of an axis passed transversely through the center of slide 70. When extended (FIGURE 2) the wings proper will each have the correct dihedral angle for stability in flight. For light aircraft this is generally around 6°.

In use, the wings are stored within the guides of the upper and lower sections as shown in FIGURE 4. They are manually withdrawn from the guides until the wings reach the extended position, at which position the automatic locking members snap in place holding the slides in fixed position between the guide plates at the frame side entrances and holding the gears 62 and 76 in proper engagement with their respective worm gears. Power assists can be used to serve this purpose, however, the construction is considerably simpler by retaining this phase of the assembly a manual function. In the wing extended position, control shafts 64 and 74 respectively can be rotated to adjust the angles of incidence of the wings by rotating them about longitudinal axes of the same.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An assembly for use in converting a land vehicle to an aircraft, said assembly comprising a frame having an upper section and a lower section connected to said upper section, said sections defining guides, a first wing in said guide defined by said upper section, a second wing in the guide defined by said lower section, each wing having a rigid slide at its inner end, means pivotally connecting said wings to said slides, said guides having entrances at alternate sides of said frame through which said wings are adapted to be extended, said slide being slidably supported in said guides, each slide being thicker than all portions of said wings outwardly of their roots, and means connected with said frame and engageable with said slides to hold said wings in the extended position when said wings are extended through said entrances and from within said guides.

2. An assembly for use in converting a land vehicle to an aircraft, said assembly comprising a frame having an upper section and a lower section connected to said upper section, said sections defining guides, a first wing in the guide defined by said upper section, a second wing in the guide defined by said lower section, each wing having a slide at its inner end, means connecting said wings to said slides, said guides having entrances at alternate sides of said frame through which said wings are adapted to be extended, means connected with said frame and engageable with said slides to hold said wings in the extended position when said wings are extended through said entrances and from within said guides, said means connecting said wings to said slide including for each wing a spindle fixed to one wing and rotatable in its adjacent slide, and control means engageable with said spindle when the wing is extended to rotate said spindle and thereby rotationally adjust the last mentioned wing.

3. The combination of claim 1 wherein said frame has frame members at the outer ends of said guides, each frame member having a pair of spaced guide plates through which the wings are adapted to pass and between which said slides are adapted to rest when said wings are in the extended position.

4. The combination of claim 1 wherein said frame has frame members at the outer ends of said guides, each frame member having a pair of spaced guide plates through which the wings are adapted to pass and between which said slides are adapted to rest when said wings are in the extended position, and control means including gearing in said frame members and attached to spindles and engageable with each other and disengageable with each other when said wings are extended and retracted respectively.

5. The combination of claim 3 wherein said upper guides and lower guides are each parallel and tilted with respect to a horizontal plane and wherein said wings include a dihedral angle with reference to said horizontal plane when in the extended position.

6. An assembly to convert from land travel to air travel in a vehicle, said assembly comprising a pair of wings, a frame, guides in said frame within which to store said wings and also constrain the travel of said wings when moved from the stored position to the extended position, means connected with said wings for rotationally adjusting said wings about the longitudinal axes of said wings, and automatically responsive means for locking said wings in the extended position, said automatically responsive means carried by said frame and engageable with a portion of each of said wings.

7. An assembly as defined in claim 6 wherein said automatically responsive means comprises spring urged detent means and said means for rotating said wings about their longitudinal axes comprise a gear fixed to the inner ends of each wing and engageable with a gear rotatably fixed to said frame.

8. An assembly as defined in claim 7 wherein said guides are inclined and parallel to one another.

References Cited in the file of this patent

UNITED STATES PATENTS

| | | |
|---|---|---|
| 2,081,436 | Martin | May 25, 1937 |
| 2,260,316 | Harris | Oct. 28, 1941 |
| 2,487,465 | Murray | Nov. 8, 1949 |
| 2,539,489 | Smith | Jan. 30, 1951 |
| 2,714,495 | Focke | Aug. 2, 1955 |
| 2,811,323 | Rethorst | Oct. 29, 1957 |
| 2,858,091 | Kapenkin | Oct. 28, 1958 |